(12) United States Patent
Lewandowski et al.

(10) Patent No.: US 11,934,822 B2
(45) Date of Patent: Mar. 19, 2024

(54) SYSTEMS AND METHODS FOR CONNECTED VEHICLE ENHANCEMENTS

(71) Applicant: Ford Global Technologies, LLC, Dearborn, MI (US)

(72) Inventors: Andrew Denis Lewandowski, Sterling Heights, MI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 17/658,399

(22) Filed: Apr. 7, 2022

(65) Prior Publication Data

US 2023/0325168 A1 Oct. 12, 2023

(51) Int. Cl.
*H04L 29/08* (2006.01)
*B60W 30/14* (2006.01)
(Continued)

(52) U.S. Cl.
CPC ............... *G06F 8/65* (2013.01); *B60W 40/02* (2013.01); *B60W 40/09* (2013.01); *B60W 50/06* (2013.01);
(Continued)

(58) Field of Classification Search
CPC ......... G06F 8/65; B60W 40/02; B60W 40/09; B60W 40/068; B60W 40/076;
(Continued)

(56) References Cited

U.S. PATENT DOCUMENTS

| 9,903,728 | B2 | 2/2018 | Powers et al. |
| 10,259,468 | B2 | 4/2019 | Avireddi et al. |

(Continued)

FOREIGN PATENT DOCUMENTS

CN 10559758 A 5/2016

OTHER PUBLICATIONS

David Dietrich et al., A Mode-Based Pattern for Feature Requirements, and a Generic Feature Interface, 2013 IEEE, [Retrieved on Oct. 16, 2023]. Retrieved from the internet: <URL: https://ieeexplore.ieee.org/stamp/stamp.jsp?tp=&arnumber=6636708> 10 Pages (82-91) (Year: 2013).*

(Continued)

*Primary Examiner* — Anibal Rivera
(74) *Attorney, Agent, or Firm* — Brandon Hicks; Eversheds Sutherland (US) LLP

(57) ABSTRACT

This disclosure describes systems and methods for connected vehicle enhancements. An example method may include causing to present, based on a first factor, an offer to install a first software update to a vehicle for a first period of time. The example method may also include receiving a request to install the first software update for the first period of time. The example method may also include causing to install the first software update on the vehicle at a first time. The example method may also include causing to disable, based on a determination that the first period of time has elapsed, the first software update on the vehicle. The example method may also include receiving a request to permanently install the software update on the vehicle. The example method may also include causing to permanently install the first software update on the vehicle at a second time.

18 Claims, 9 Drawing Sheets

(51) Int. Cl.
 *B60W 30/18* (2012.01)
 *B60W 40/02* (2006.01)
 *B60W 40/09* (2012.01)
 *B60W 50/06* (2006.01)
 *G06F 8/65* (2018.01)
 *B60W 50/00* (2006.01)

(52) U.S. Cl.
 CPC ....... *B60W 30/18018* (2013.01); *B60W 50/00* (2013.01); *B60W 50/0097* (2013.01); *B60W 50/0098* (2013.01); *B60W 2540/30* (2013.01); *B60W 2555/20* (2020.02); *B60W 2556/10* (2020.02)

(58) Field of Classification Search
 CPC ............. B60W 50/06; B60W 50/0098; B60W 50/0097; B60W 50/00; B60W 2556/10; B60W 2555/20; B60W 2540/30; B60W 30/18018; B60W 30/156
 See application file for complete search history.

(56) References Cited

U.S. PATENT DOCUMENTS

| | | | |
|---|---|---|---|
| 2011/0210867 A1 | 9/2011 | Benedikt | |
| 2018/0047107 A1* | 2/2018 | Perl | G06Q 20/10 |
| 2019/0294427 A1* | 9/2019 | Kassner | B60W 50/00 |
| 2020/0186620 A1* | 6/2020 | Golgiri | B60W 30/16 |
| 2022/0396218 A1* | 12/2022 | Ono | H04W 4/029 |

OTHER PUBLICATIONS

Subir Halder, et al., Secure OTA Software Updates in Connected Vehicles: A Survey, IEEE, Apr. 2019, 1-18.

* cited by examiner

SYSTEMS AND METHODS FOR CONNECTED VEHICLE ENHANCEMENTS

BACKGROUND

Almost everything on a vehicle bought today involves a single transaction—once a customer purchases the vehicle, the transaction is completed. From that point on, the only customer interaction may include maintenance or warranty service at the dealership until the customer decides to trade the vehicle in and lease or purchase a new vehicle. The vehicle performs as manufactured from that point on (not considering changes due to wear and tear over time).

The customer typically has to make a decision on a vehicle based on taking a short test drive. Some original equipment manufacturers (OEMs) and dealers have offered longer test drives or overnights with a vehicle, but this is not a common practice, and still only presents the vehicle to the customer as driven off the lot. Some vehicles are being sold with hardware not intended for use unless the customer pays for a software upgrade. This is a useful option if the customer decides to purchase a feature at a later time, but is also costly for the OEM to include this hardware. Other vehicles are beginning to offer over the air (OTA) updates for vehicle modules, but most of this is removing the dealer from the equation, making it more convenient for a customer to get a warranty or customer satisfaction issue/TSB addressed. Current OTA updates have been primarily limited to fixing issues. Occasionally, companies will offer bonus content to customers via OTA: slightly increased power, slightly more battery range, a new app to play a game in their center stack, etc. However, companies do not offer more personalized experiences and opportunities to their customers: things like geofenced driving modes, which can be unlocked in certain areas and under certain conditions, automatic adjustment of suspension characteristics based on the environmental conditions the customer is facing (harsh winters, etc), and tailored ADAS features to suit the customer's normal driving habits. The problem is vehicles are not interactive with the customer and do not adapt to them to suit their driving styles, driving conditions, location, or multiple drivers.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
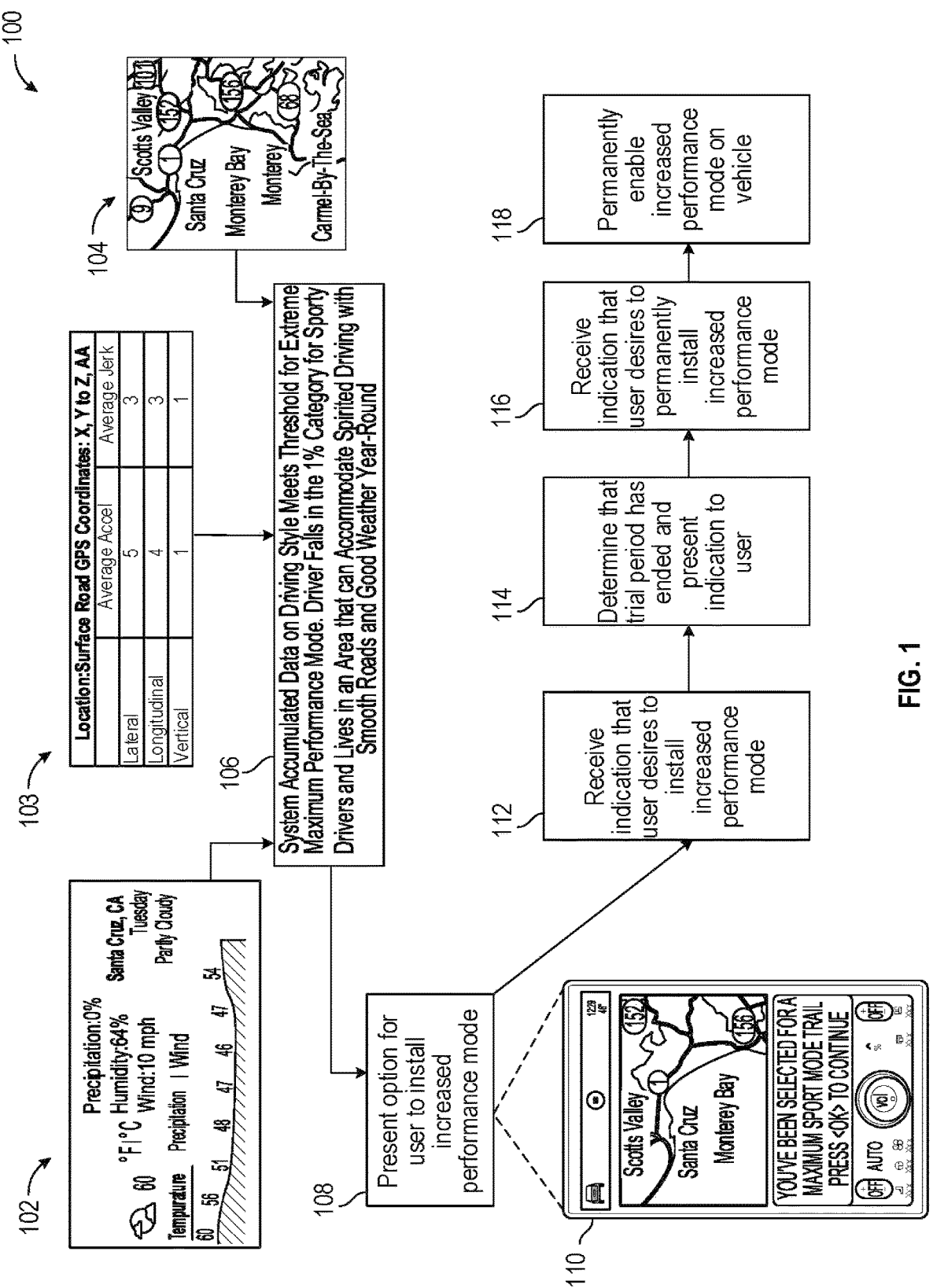
FIG. 1 illustrates an example use case, in accordance with one or more embodiments of the disclosure.

This disclosure relates to, among other things, systems and methods for connected vehicle enhancements. Particularly, the systems and methods may be usable to provide software update options to vehicle owners (which may be referred to herein as "users" as well) after purchase of a vehicle. In some cases, these software updates that are provided may be unique to every owner, and may be based on factors such as driving behavior, weather conditions, road conditions, a location of the vehicle, or maintenance requirements/durability considerations of the vehicle, to name a few non-limiting examples. These updates may be recommended to the vehicle owner, and the owner may then choose whether or not to accept the updates. Upon acceptance, the vehicle software may be updated to implement the suggested changes. Previous systems have relied on the driver to select a pre-programmed drives mode such as eco mode, sport mode, snow mode, etc. While these pre-programmed modes may provide some value, they present the same functionality across all vehicles, regardless of the particular needs of the vehicle owner.

In some cases, these suggested updates can be offered to the vehicle owner on a trial basis. This may allow the vehicle owner to test a recommended software update before committing to paying for the software update to be installed. The trial period may allow the owner to test the software update on a temporary basis (for example, for a given period of time, within a pre-defined location, for a given number of miles, etc.). Once the trial period has elapsed, the owner may be prompted to indicate whether they wish to keep the software update on the vehicle. If so, they vehicle owner may purchase the software update, and the update may remain on the vehicle and/or may be re-installed on the vehicle (if the software update was uninstalled automatically once the trial period ended). As one example, based on a determination that a vehicle owner often traverses an off-road path, the owner may be presented with a recommendation (which may also be referred to as an "offer" herein) for a comfort package software update that adjusts the suspension settings of the vehicle to provide a more comfortable off-road driving experience. The owner may have the option to test the comfort package software update for a period of a week. When the week trial is over, the owner may again be presented with an option to keep the performance package software update installed. If the owner accepts, the performance package software update may remain installed on the vehicle. Otherwise, the software of the vehicle may be reverted back to the initial suspension settings.

There are a number of different types of modes that may be recommended to a vehicle owner. Several examples are provided below, however, it should be noted that these are merely examples and not intended to be limiting in any way. Any other types of modes other than those listed below may also be recommended to a vehicle owner. Furthermore, some of these modes may be described in additional detail with respect to the use cases illustrated in FIGS. 1-6.

A first example software update may include an increased performance mode in which the vehicle may be tuned for more spirited driving (for example, increased horsepower, tighter suspension, etc.). This increased performance mode may be enabled at all times, or may be enabled when the vehicle owner enters a particular stretch of road that is known for spirited driving (either in general, or specifically indicated by the vehicle owner).

A second example software update may include an increased comfort mode. The increased comfort mode, similar to the increased performance mode, may be enabled at all times, or may be enabled when the vehicle owner enters a particular stretch of road that may present an increased level of discomfort for the user (for example, an off-road trail, a bumpy road, etc.).

A third example software update may include a reduced performance mode that may be implemented to ensure durability of vehicle components is maintained. That is, some vehicle owners may prefer to maximize the lifetime of vehicle components over performance driving. In this mode, the performance of the vehicle may be reduced to maximize the lifetime of these components. The reduced performance mode may also be offered temporarily. For example, even if the vehicle owner prefers performance driving, the system may monitor the status of vehicle components, and may recommend to the vehicle owner to reduce performance driving when certain vehicle components are near the end of their recommended lifetime.

A fourth example software update may include updates to existing vehicle advanced driver assist system (ADAS) features that are used by the vehicle owner. For example, vehicles often already have automatic cruise control functionality available. However, the system may analyze the specific usage of the automatic cruise control by the vehicle owner (for example, how often they override the automatic cruise control), and may use this information to offer a more user-customized automatic cruise control setting. In this manner, existing ADAS features may be fine tuned for an individual user.

In some cases, temporary usage of certain vehicle software updates may be offered as incentives to vehicle owners in exchange for a desired manner of operating the vehicle. For example, it may be desirable for a vehicle owner to typically engage in conservative driving behaviors (less aggressive acceleration/braking, etc.) to maximize the lifetime of vehicle components. In order to incentivize a vehicle owner to engage in this type of driving behavior, the vehicle owner may, in response to a threshold amount of conservative driving, be presented with the option for a one-time use mode such as an extreme performance mode. This may allow the user to experience increased performance of the vehicle temporarily, while still maximizing the durability of vehicle components overall.

Some modes associated with some of the software updates may only be enabled temporarily. That is, some of the features may only be enabled when certain conditions are met, even after the software update is permanently installed on the vehicle. A first example condition may include the vehicle being within a given geofence region. For example, a vehicle owner may live in Chicago, but may drive to a mountainous area for a vacation. Upon arrival, the system may inform the driver they are driving on a particular road that is well-known for performance driving, and that a temporary increased performance mode is available for the route. If an increased performance mode is already installed on the vehicle, the performance features associated with the mode may automatically be applied to the vehicle as soon as the vehicle enters this specific region. Similarly, the performance features may be deactivated once the vehicle leaves the region. Alternatively, when the vehicle enters the geofence region associated with the specific increased performance mode, a prompt may be presented to the vehicle owner on a user interface indicating that they have entered the geofence region and asking if they would like to enable to installed increased performance mode. In some cases, these performance features may be specific to that exact region. That is, different types of performance features may be applied in different regions. However, in other cases, the performance features may simply include a general performance package that may be applicable regardless of the specific region the owner is driving in.

A second example condition may include may include a particular time period (for example, time of day, month, etc.). For example, certain vehicle software packages may only be activated during nighttime driving. As another example, certain vehicle software packages may only be activated during certain times of the year. For example, during winter months, the vehicle may limit the amount of power that is available upon vehicle start-up to prevent damage to the engine of the vehicle.

A fourth example condition may include environmental conditions. Environmental conditions may include factors such as weather conditions and road conditions (to name a few non-limiting examples). For example, during snow conditions, a software update to enhance the performance of a traction control system of the vehicle may automatically be applied. If the vehicle is determined to be driving on an unpaved and/or uneven road surface, a comfort mode (for example, softening of the suspension, etc.) may automatically be applied to provide a more comfortable ride for the driver.

A fifth example condition may include maintenance-related aspects of the vehicle. For example, the vehicle may determine that the vehicle has been driven 10,000 miles since the last tire installation. Based on this, the vehicle may determine that the tires are likely worn down and that a tire change may be required soon. As a result of this, the vehicle may activate an increased durability mode that may increase the longevity of the tires (for example, reduce the performance of the vehicle). Tire wear is only one example of vehicle maintenance/durability that may be tracked, and any other vehicle components may similarly be monitored. Additionally, an increased durability mode may be recommended to a user that may adjust the performance of the vehicle to maximize the durability of vehicle components and the lifetime of the vehicle, and minimize the required maintenance to the vehicle.

These conditions are only intended to be exemplary to illustrate that the vehicle software updated, even once installed to a vehicle on a non-trial basis, may not necessarily always be enabled in the vehicle. Any other conditions may also be applicable as well.

The software update recommendations may be presented to the vehicle owner through a number of different user interfaces. As a first example, the software update recommendations may be presented to the vehicle owner through a human machine interface (HMI) of the vehicle. As a second example, the software update recommendations may be presented to the vehicle owner through a mobile phone application. In some cases, the recommendation may provide the user with information about the particular software update, such as the changes that would be made to the functionality of the vehicle, the reason for presenting the recommendation, the times and/or places in which the software update would be applicable (for example, in cases where a particular software update is only enabled in a specific stretch of road as is described in further detail herein). The user interface may also allow the user to interact with the recommendation, including accepting or declining the recommendation to install the software update and/or indicate at the end of a trial period whether the user desires to keep the software update installed on the vehicle.

In some embodiments, the system may determine which software updates to recommend to the vehicle owner based on different types of captured data. Such data, for example, may include data relating to the vehicle itself, data relating to the historical driving behavior of the vehicle owner, and/or data relating to the environment in which the vehicle operates (location data, for example), to name a few examples.

In terms of vehicle data and historical driver behavior data, inputs such as longitudinal, lateral and vertical acceleration, ADAS sensor information, and GPS locations may be used to determine whether the vehicle owner tends to drive in a more spirited manner, or if the vehicle owner prefers a more comfortable ride. Data relating to the amount of miles on a particular vehicle component (and other wear/tear on the vehicle component) may also be used by the system to make durability and maintenance determinations. can be used to create custom profiles to significantly change the active suspension, steering, acceleration pedal maps, tire pressures (or suggest pressures if an on-board system is not available) and braking pedal maps (EBB systems). Powertrain calibrations can also be changed—understanding this is less likely for ICE vehicles given emissions and EPA regulations but thinking ahead to EVs and hybrids it starts to make more sense.

Finally, any software updates that are installed to one vehicle owner by a vehicle owner may be stored to a profile associated with that vehicle owner. This may allow the vehicle owner to transfer already purchased software updates to other vehicles owned/purchased by the vehicle owner. However, in some cases, the software updates may be limited to only the one specific vehicle.

Turning to the figures, FIG. 1 illustrates an example use case 100, in accordance with one or more embodiments of the disclosure. Particularly, the use case 100 may illustrate a scenario in which an increased performance mode for the vehicle is offered to the user. This increased performance mode of the vehicle may permanently or temporarily provide certain performance enhancements to the vehicle in the form of software updates (for example, an electronic control unit (ECU) of the vehicle may be updated with a more performance-friendly tune that may unlock additional horsepower for the vehicle).

In some embodiments, the use case 100 may begin with operation 106, which may involve determining that a condition is met indicating that an increased performance mode should be offered to the user. In some cases, the condition may include determining that the user falls within a certain percentage of drivers in terms of a tendency to drive in a performance-oriented manner (for example, higher acceleration, g-force, etc.). The condition may also involve determining that the user drivers the vehicle in a performance oriented manner for a threshold percentage of time the vehicle is being driven. The condition may also include determining that the driver lives in a location that can accommodate spirited driving (for example, includes good weather and smooth roads). These determinations may be made based on obtained data. This data, for example, may include a first type of data 102, a second type of data 103, and/or a third type of data 104. The first type of data 102 depicted in the figure may include weather information. The second type of data 103 may include data relating to the usage of the vehicle, such as acceleration data, g-force data, etc. The third type of data 104 may include location data associated with a location where the vehicle is typically driven. It should be noted that these types of data and the condition are merely intended to be exemplary, and any other types of data and/or conditions or combination of conditions may also be applicable in this use case 100.

Operation 106 may be followed by operation 108, which may involve presenting an offer 110 to the user to install the increased performance mode in the vehicle. The offer 110 may be presented to the user through one or more user interfaces. For example, the offer 110 may be presented through an application of a mobile device of the user, on an HMI of the vehicle, and/or in any other manner. The offer 110 may also be associated with a description providing an explanation to the user of the features that accompany the particular software package being presented to the user. In some cases, the offer 110 may be for a trial period during which the user may test the increased performance mode to determine if they would like to purchase the increased performance mode for permanent usage. However, in other cases, the offer may not necessarily only be for a trial period, but may also allow the user to bypass the trial period and permanently install the mode. Allowing the user to bypass the trial period may be applicable to any other software update described herein.

Operation 108 may be followed by operation 112. Operation 112 may involve the user receiving an indication that the user desires for the increased performance mode to be installed on the vehicle for the trial period. For example, the user may select a button on a user interface of their mobile device and/or the HMI of the vehicle. The user may also indicate acceptance in any other manner, such as an auditory acceptance. Once the acceptance is received, the increased performance mode may be installed on the vehicle. Since the increased performance mode is only installed on a trial basis, the mode may be limited for a particular period of time. For example, the user may be allowed to test the increased performance mode for a period of a week. The increased performance mode may be limited in any other manner (for example, distance, location, etc.).

Operation 112 may be followed by operation 114. Operation 114 may involve determining that the trial period has elapsed and presenting an indication of such to the user. The indication may also include an option for the user to purchase the increased performance mode for permanent usage. If the user indicates that they desire to purchase the increased performance mode, the mode may be re-enabled on the vehicle for permanent usage by the user. However, if the user indicates that they do not desire to purchase the increased performance mode, then the mode may either remain installed, but disabled, or may be uninstalled from the vehicle. In some cases, once the trial period has elapsed, the system may automatically disable the increased performance mode. However, in other cases, the mode may remain enabled, but may be disabled depending on how the user responds to the offer.

Operation 114 may be followed by operation 116 and operation 118. Operation 116 may involve receiving an indication that user desires to permanently install increased performance mode. Operation 118 may involve permanently enabling the increased performance mode on vehicle. That is, the increased performance mode remained installed, but was simply disabled when the trial period elapsed, then the mode may be re-enabled upon acceptance by the user. On the other hand, if the increased performance mode was uninstalled after the trial period elapsed, then the mode may be re-installed upon acceptance by the user. It should be noted that "permanently installing" the mode on the vehicle may not necessarily mean that the mode is always enabled. For example, some modes described herein may only be temporarily enabled, even after purchase by a user (such as performance modes that are activated in specific geographic locations, including at least the location-specific performance mode described with respect to FIG. 2). Rather, "permanently installing" may mean that the mode may no longer be subject to a trial period.

Reference may be made in the use case 100 to determinations may be a "system." In some cases, these determinations may be made locally by the vehicle, remotely by a remote system, or using a combination of the two. Additional details may be provided in FIG. 7 with respect to example system 700. The usage of local and/or remote processing may also be applicable to any other use case described herein as well.

Figure 2:
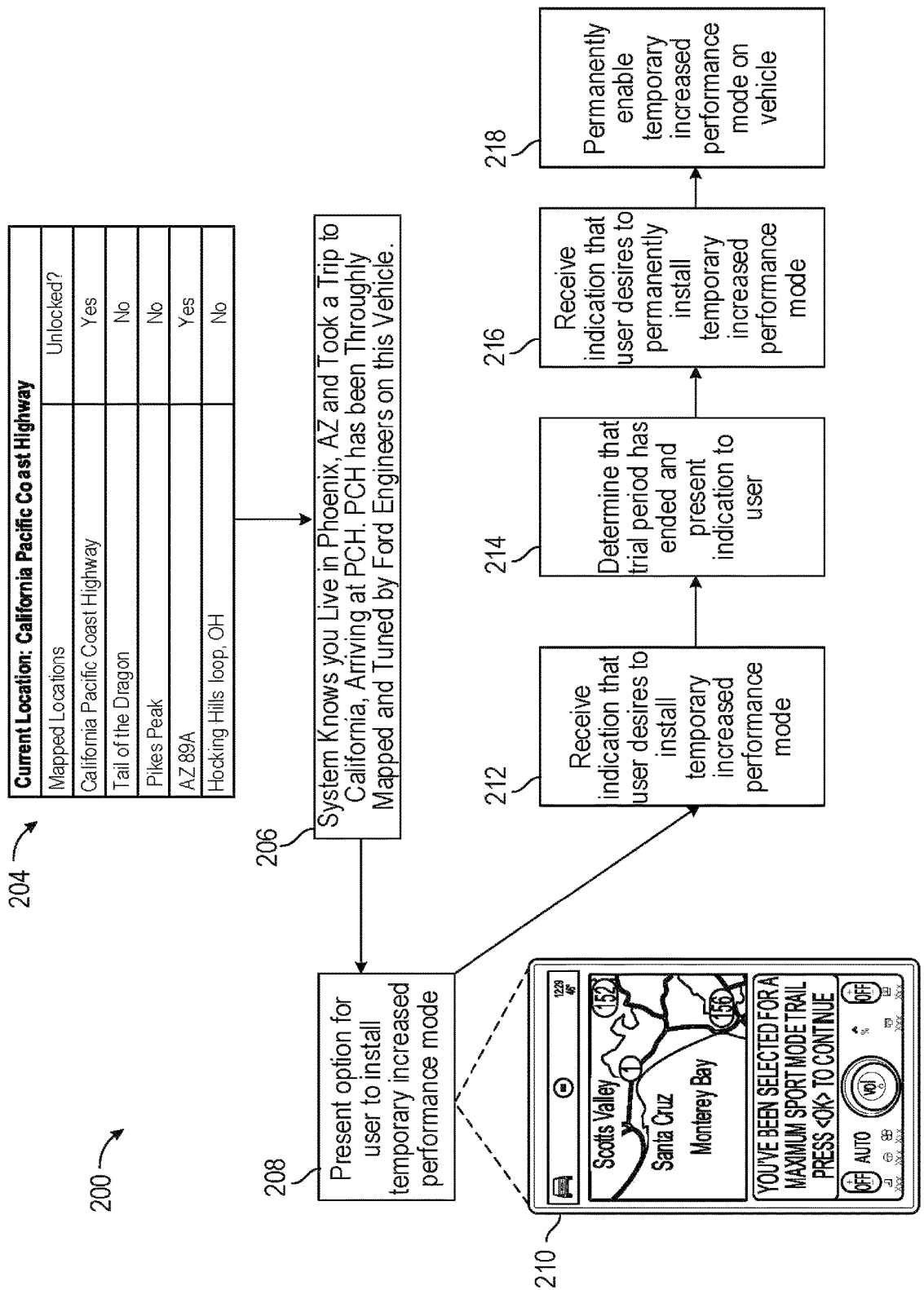
FIG. 2 illustrates another example use case, in accordance with one or more embodiments of the disclosure.

FIG. 2 illustrates an example use case 200, in accordance with one or more embodiments of the disclosure. That is, while the use case 100 and use case 200 may similarly offer an increased performance package to the user, the use case 200 may be a temporary mode that may be location-specific. That is, the mode may be triggered based on the user being within a pre-defined geofence region that is known for sporty driving, rather than the mode being offered based on historical data indicating the user prefers performance driving. Additionally, the mode may be tuned specifically for that particular location. For example, if the particular location is a mountainous road, the package may involve tuning the vehicle for better handling (for example, stiffening the suspension, lowering the right height, etc.). In this manner, multiple of these modes may be presented to the user as the user enters different of such locations, with each mode being specifically tuned to each location (however, in some cases, the modes may be temporarily activated, but may include the same performance tune regardless of location).

In some embodiments, the use case 200 may begin with operation 206, which may involve determining that a condition is met indicating that an increased performance mode should be offered to the user. For example, the condition for determining that the increased performance mode should be offered may include determining that the user has entered a particular geofence region. For example, the system may have stored a listing 204 of different locations that are associated with spirited driving, such as a mountainous road, a race track, etc. The listing 204 may also indicate which locations for which the user has increased performance modes already installed. For example, the listing may be maintained locally at the vehicle and/or remotely at a remote server. Once it is determined that the vehicle has entered one of these predetermined regions, the condition may be met. This determination may be made based on input data, which may include location data associated with the vehicle. It should be noted that these types of data and the condition are merely intended to be exemplary, and any other types of data and/or conditions may also be applicable in this use case 200.

Operation 206 may be followed by operation 208, which may involve presenting an offer 210 to the user to install the increased performance mode (that is specific to the particular location) in the vehicle. The offer 210 may be presented to the user through one or more user interfaces. For example, the offer 210 may be presented through an application of a mobile device of the user, on an HMI of the vehicle, and/or in any other manner. The offer 210 may also be associated with a description providing an explanation to the user of the features that accompany the particular software package being presented to the user. In some cases, the offer 210 may be for a trial period during which the user may test the increased performance mode to determine if they would like to purchase the increased performance mode for permanent usage. It should be noted that because the increased performance modes offered through the use case 200 are location-specific, the vehicle may not necessarily be limited to just one of these software packages. For example, the vehicle may enter a first location and receive a first offer for a mode specific to that first location, and then may, at a second time, enter a second location and receive a second offer for a mode that is specific to that second location.

Operation 208 may be followed by operation 212. Operation 212 may involve receiving an indication that the user desires to download the trial software package for the increased performance mode. For example, the user may select a button on a user interface of their mobile device and/or the HMI of the vehicle. The user may also indicate acceptance in any other manner, such as an auditory acceptance. Once the acceptance is received, the location-specific increased performance mode may be installed on the vehicle. Since the location-specific increased performance mode is only installed on a trial basis, the mode may be limited for a particular period of time. For example, the user may be allowed to test the location-specific increased performance mode for a period of a week. Additionally, since this particular mode is location based, the trial period may be run as long as the user is within the geofence region associated with the location. Once the user leaves the geofence region, the trial period may end.

Operation 214 may be followed by operation 214. Operation 214 may involve determining that the trial period has ended and presenting an indication of such to the user. The indication may also include an option for the user to purchase the location-specific increased performance mode for permanent usage. If the user indicates that they desire to purchase the location-specific increased performance mode, the mode may be re-enabled on the vehicle for permanent usage by the user. However, if the user indicates that they do not desire to purchase the location-specific increased performance mode, then the mode may either remain installed, but disabled, or may be uninstalled from the vehicle. In some cases, once the trial period has elapsed, the system may automatically disable the increased performance mode. However, in other cases, the mode may remain enabled, but may be disabled depending on how the user responds to the prompt. Additionally, it should be noted that even when this location-specific increased performance mode is installed on the vehicle, it may not necessarily be active at all times. That is, because the mode is location-specific, the mode may, in some cases, only be activated when the vehicle re-enters the geofence region at a subsequent time. In such cases, the system may prompt the user whether they want to re-enable the feature once they enter the region, or the system may automatically re-enable the mode.

Operation 214 may be followed by operation 216 and operation 218. Operation 216 may involve receiving an indication that user desires to permanently install the temporary increased performance mode. Operation 218 may involve permanently enabling the temporary increased performance mode on vehicle. That is, the temporary increased performance mode remained installed, but was simply disabled when the trial period elapsed, then the mode may be re-enabled upon acceptance by the user. On the other hand, if the temporary increased performance mode was uninstalled after the trial period elapsed, then the mode may be re-installed upon acceptance by the user. It should be noted that "permanently installing" the mode on the vehicle may not necessarily mean that the mode is always enabled. For example, the temporary increased performance mode may still only be enabled when the user enters the particular location associated with the temporary increased performance. Rather, "permanently installing" may mean that the mode may no longer be subject to a trial period.

Figure 3:
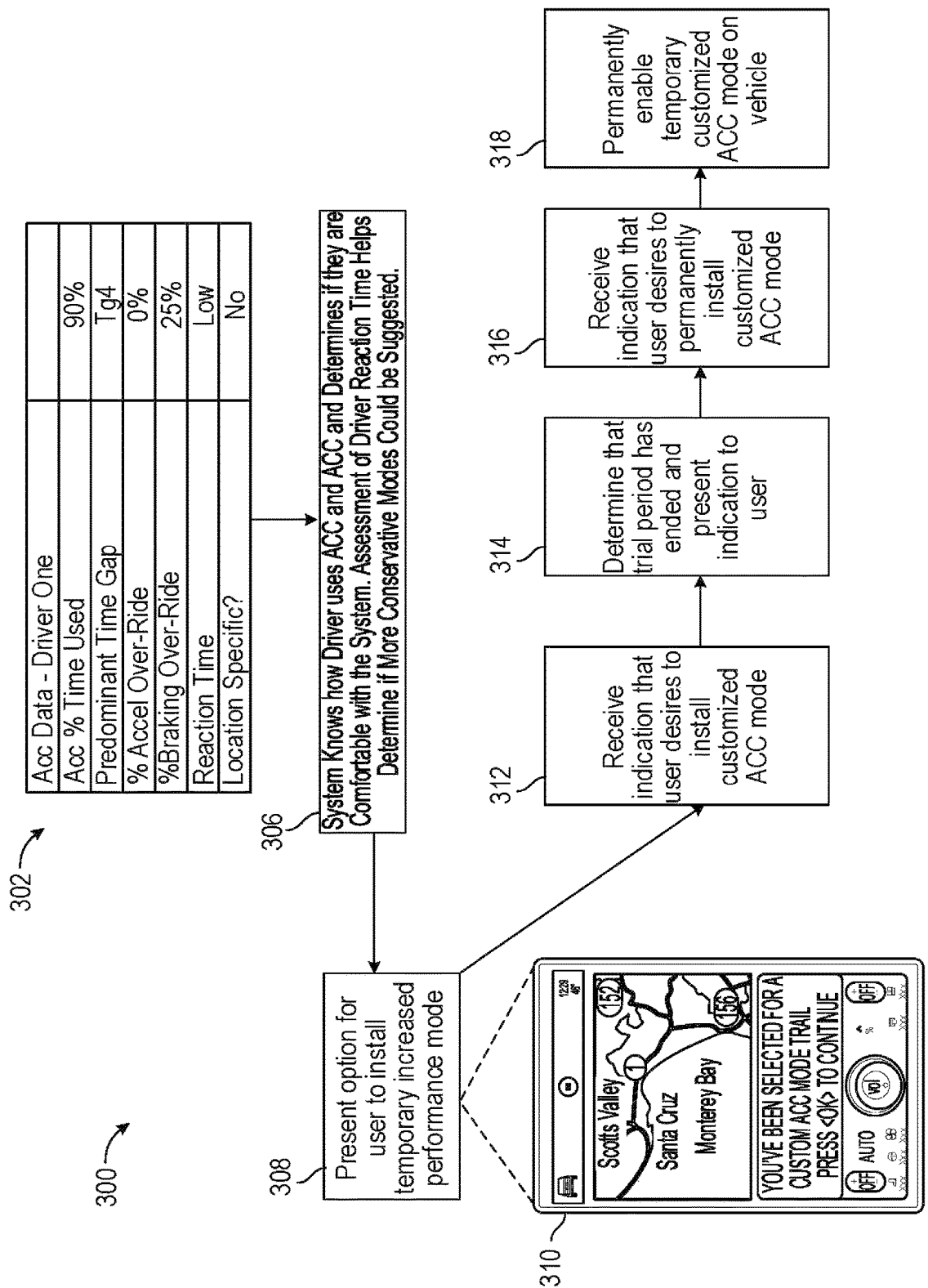
FIG. 3 illustrates another example use case, in accordance with one or more embodiments of the disclosure.

FIG. 3 illustrates an example use case 300, in accordance with one or more embodiments of the disclosure. Particularly, the use case 300 may illustrate a scenario in which a customized automated cruise control (ACC) mode for the vehicle is offered to the user. Although reference may be made specifically to the ACC feature of the vehicle, the use case 300 may similarly apply to any other vehicle ADAS feature, such as lane assist, for example.

In some embodiments, the use case 300 may begin with operation 306, which may involve capturing and analyzing data 302 to determine if the customized ACC mode should be offered. For example, the data 302 may include a percentage of the time the ACC feature is used by the user, a time gap setting that the user typically employs, a percentage of the time the user overrides the ACC acceleration, a percentage of the time the user overrides the ACC braking, a reaction time of the user, and/or any other types of data. It should be noted that these types of data and the condition are merely intended to be exemplary, and any other types of data and/or conditions may also be applicable in this use case 300.

Operation 306 may be followed by operation 308, which may involve presenting an offer 310 to the user to install the customized ACC mode in the vehicle. The offer 310 may be presented to the user through one or more user interfaces. For example, the offer 310 may be presented through an application of a mobile device of the user, on an HMI of the vehicle, and/or in any other manner. The offer 312 may also be associated with a description providing an explanation to the user of the features that accompany the particular software package being presented to the user. In some cases, the offer 310 may be for a trial period during which the user may test the increased performance mode to determine if they would like to purchase the increased performance mode for permanent usage.

Operation 308 may be followed by operation 312. Operation 312 may involve receiving an indication that the user desires to download the trial software package for the increased performance mode. For example, the user may select a button on a user interface of their mobile device and/or the HMI of the vehicle. The user may also indicate acceptance in any other manner, such as an auditory acceptance. Once the acceptance is received, the customized ACC mode may be installed on the vehicle. Since the customized ACC mode is only installed on a trial basis, the mode may be limited for a particular period of time. For example, the user may be allowed to test the customized ACC mode for a period of a week.

Operation 312 may be followed by operation 314. Operation 314 may involve determining that the trial period has ended and presenting an indication of such to the user. The indication may also include an option for the user to purchase the customized ACC mode for permanent usage. If the user indicates that they desire to purchase the customized ACC mode, the mode may be re-enabled on the vehicle for permanent usage by the user. However, if the user indicates that they do not desire to purchase the customized ACC mode, then the mode may either remain installed, but disabled, or may be uninstalled from the vehicle. In some cases, once the trial period has elapsed, the system may automatically disable the customized ACC mode. However, in other cases, the mode may remain enabled, but may be disabled depending on how the user responds to the prompt.

Operation 314 may be followed by operation 316 and operation 318. Operation 316 may involve receiving an indication that user desires to permanently install the customized ACC mode. Operation 318 may involve permanently enabling the customized ACC mode on vehicle. That is, the customized ACC mode remained installed, but was simply disabled when the trial period elapsed, then the mode may be re-enabled upon acceptance by the user. On the other hand, if the customized ACC mode was uninstalled after the trial period elapsed, then the mode may be re-installed upon acceptance by the user. It should be noted that "permanently installing" the mode on the vehicle may not necessarily mean that the mode is always enabled. For example, some modes described herein may only be temporarily enabled, even after purchase by a user (such as performance modes that are activated in specific geographic locations, including at least the location-specific performance mode described with respect to FIG. 2). Rather, "permanently installing" may mean that the mode may no longer be subject to a trial period.

Figure 4:
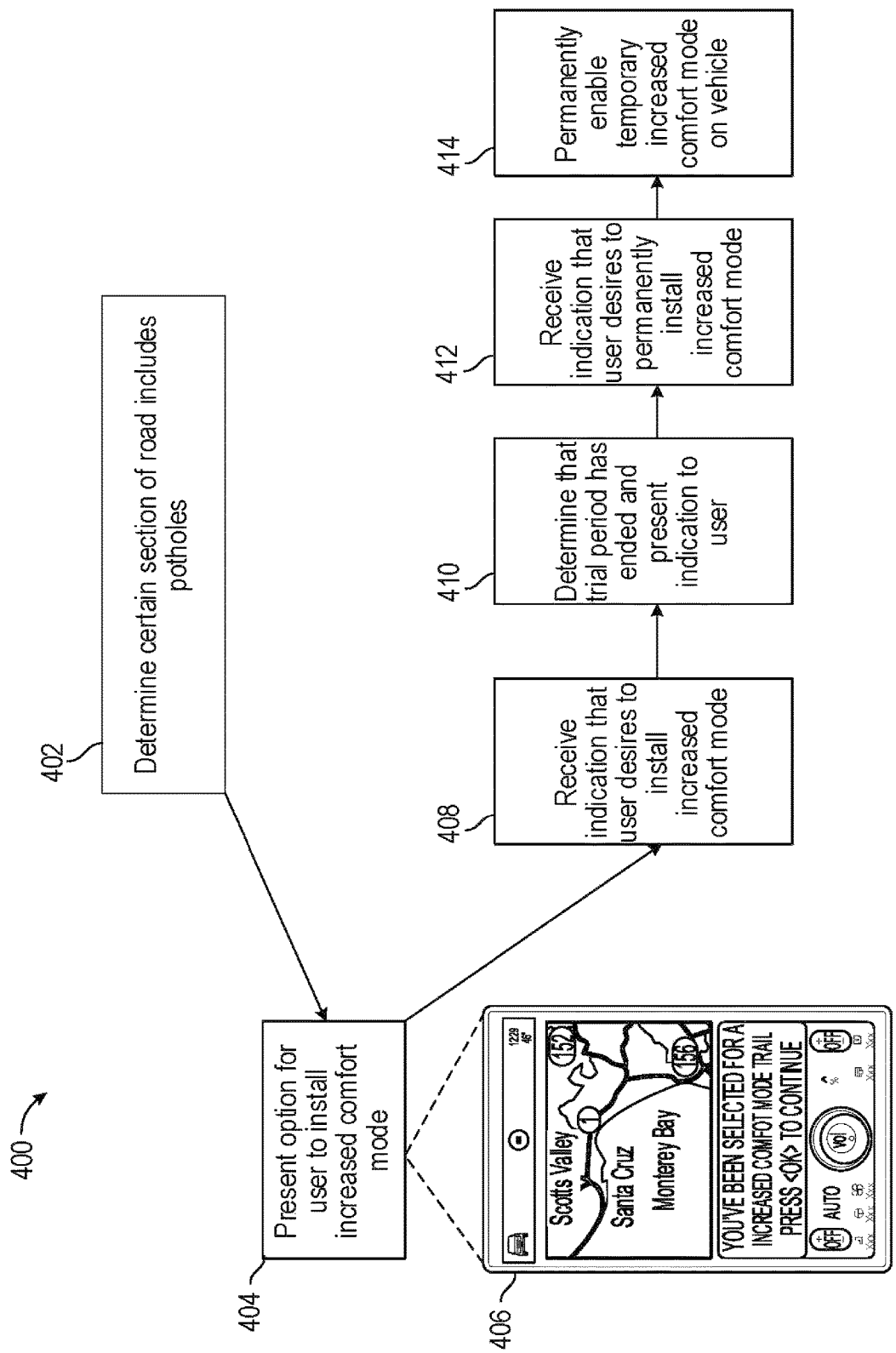
FIG. 4 illustrates another example use case, in accordance with one or more embodiments of the disclosure.

FIG. 4 illustrates an example use case 400, in accordance with one or more embodiments of the disclosure. Particularly, the use case 400 may illustrate a scenario in which an increased comfort mode for the vehicle is offered to the user. The increased comfort mode may be a mode that adjusts the operation of the vehicle to provide a smoother and more comfortable ride for the user. In some cases, the increased comfort mode may provide general changes to the vehicle that may provide a more comfortable ride in general (for example, similar to how the increased performance mode may be used at all times as described in use case 100). In other cases, the increased comfort mode may provide changes to the vehicle to provide a more comfortable ride based on a specific stretch of road that a user is about to enter (for example, similar to how the increased performance mode may be used in specification locations as described in use case 200).

In some embodiments, the use case 400 may begin with operation 402, which may involve determining that a condition is met indicating that an increased comfort mode should be offered to the user. A first example of such a condition may include historical driver data indicating that the driver prefers more conservative driving (for example, less acceleration, softer braking, less lateral g-force during turns, etc.). As a second example of such a condition, the comfort mode may be offered in response to the vehicle entering a particular geofence location. For example, the vehicle may enter a stretch of poorly paved roads, on off-road trail, or any other type of road that may cause a decrease in the ride comfort of the vehicle. It should be noted that these types of data and the condition are merely intended to be exemplary, and any other types of data and/or conditions may also be applicable in this use case 400.

Operation 402 may be followed by operation 404, which may involve presenting an offer 406 to the user to install the increased performance mode in the vehicle. The offer 406 may be presented to the user through one or more user interfaces. For example, the offer 406 may be presented on an application of a mobile device of the user, on an HMI of the vehicle, and/or in any other manner. The offer 406 may also be associated with a description providing an explanation to the user of the features that accompany the particular software package being presented to the user. In some cases, the offer 406 may be for a trial period during which the user may test the increased comfort mode to determine if they would like to purchase the increased comfort mode for permanent usage.

Operation 404 may be followed by operation 408. Operation 408 may involve the user agreeing to download the trial software package for the increased comfort mode. For example, the user may select a button on a user interface of their mobile device and/or the HMI of the vehicle. The user may also indicate acceptance in any other manner, such as an auditory acceptance. Once the acceptance is received, the increased comfort mode may be installed on the vehicle. Since the increased comfort mode is only installed on a trial basis, the mode may be limited for a particular period of time. For example, the user may be allowed to test the increased comfort mode for a period of a week.

Operation 408 may be followed by operation 410. Operation 416 may involve determining that the trial period has elapsed and presenting an indication of such to the user. The indication may also include an option for the user to purchase the increased performance mode for permanent usage. If the user indicates that they desire to purchase the increased comfort mode, the mode may be re-enabled on the vehicle for permanent usage by the user. However, if the user indicates that they do not desire to purchase the increased comfort mode, then the mode may either remain installed, but disabled, or may be uninstalled from the vehicle. In some cases, once the trial period has elapsed, the system may automatically disable the increased comfort mode. However, in other cases, the mode may remain enabled, but may be disabled depending on how the user responds to the prompt.

Operation 410 may be followed by operation 412 and operation 414. Operation 412 may involve receiving an indication that user desires to permanently install the increased comfort mode. Operation 414 may involve permanently enabling the increased comfort mode on vehicle. That is, the increased comfort mode remained installed, but was simply disabled when the trial period elapsed, then the mode may be re-enabled upon acceptance by the user. On the other hand, if the increased comfort mode was uninstalled after the trial period elapsed, then the mode may be re-installed upon acceptance by the user. It should be noted that "permanently installing" the mode on the vehicle may not necessarily mean that the mode is always enabled. For example, some modes described herein may only be temporarily enabled, even after purchase by a user (such as performance modes that are activated in specific geographic locations, including at least the location-specific performance mode described with respect to FIG. 2). Rather, "permanently installing" may mean that the mode may no longer be subject to a trial period.

Figure 5:
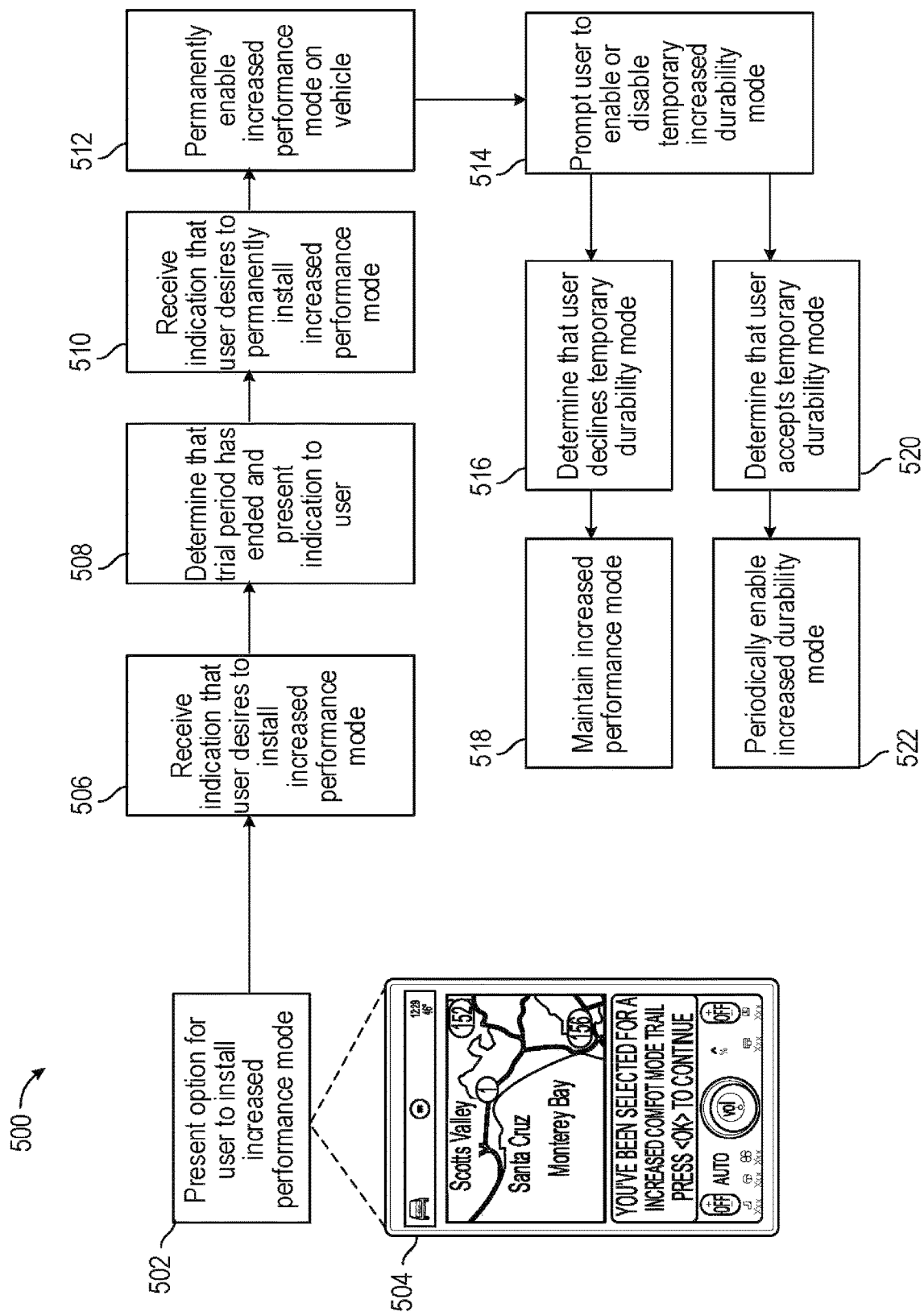
FIG. 5 illustrates another example use case, in accordance with one or more embodiments of the disclosure.

FIG. 5 illustrates an example use case 500, in accordance with one or more embodiments of the disclosure. Particularly, the use case 500 may involve offering an "extreme sport" mode to a user. The extreme sport mode may provide elevated handling, acceleration, and braking to maximize performance of the vehicle (similar to other increased performance modes as described herein). However, the extreme sport mode may also present to the user the option to occasionally reduce the performance of the vehicle in order to use the increased performance of the extreme sport mode, while also minimizing the impact of the mode on the durability of the parts of the vehicle.

In some embodiments, the use case 500 may begin with operation 502, which may involve presenting an offer 504 to the user to install the extreme sport mode in the vehicle. The offer 504 may be presented to the user in any number of different manners. For example, the offer 504 may be presented on a mobile device of the user, on an HMI of the vehicle, and/or in any other form. The offer 504 may also be associated with a description providing an explanation to the user of the features that accompany the particular software package being presented to the user. In some cases, the offer 504 may be for a trial period during which the user may test the extreme sport mode to determine if they would like to purchase the extreme sport mode for permanent usage.

Operation 502 may be followed by operation 506. Operation 506 may involve receiving an indication that the user desires to download the trial software package for the extreme sport mode. For example, the user may select a button on a user interface of their mobile device and/or the HMI of the vehicle. The user may also indicate acceptance in any other manner, such as an auditory acceptance. Once the acceptance is received, the extreme sport mode may be installed on the vehicle. Since the extreme sport mode is only installed on a trial basis, the mode may be limited for a particular period of time. For example, the user may be allowed to test the increased performance mode for a period of a week.

Operation 506 may be followed by operation 508. Operation 508 may involve determining that the trial period has elapsed and presenting an indication of such to the user. The indication may also include an option for the user to purchase the extreme sport mode for permanent usage. If the user indicates that they desire to purchase the extreme sport mode, the mode may be re-enabled on the vehicle for permanent usage by the user. However, if the user indicates that they do not desire to purchase the extreme sport mode, then the mode may either remain installed, but disabled, or may be uninstalled from the vehicle. In some cases, once the trial period has elapsed, the system may automatically disable the extreme sport mode. However, in other cases, the mode may remain enabled, but may be disabled depending on how the user responds to the prompt.

Operation 508 may be followed by operation 510 and operation 512. Operation 510 may involve receiving an indication that user desires to permanently install the increased comfort mode. Operation 512 may involve permanently enabling the increased comfort mode on vehicle. That is, the increased comfort mode remained installed, but was simply disabled when the trial period elapsed, then the mode may be re-enabled upon acceptance by the user. On the other hand, if the increased comfort mode was uninstalled after the trial period elapsed, then the mode may be re-installed upon acceptance by the user. It should be noted that "permanently installing" the mode on the vehicle may not necessarily mean that the mode is always enabled. For example, some modes described herein may only be temporarily enabled, even after purchase by a user (such as performance modes that are activated in specific geographic locations, including at least the location-specific performance mode described with respect to FIG. 2). Rather, "permanently installing" may mean that the mode may no longer be subject to a trial period.

Operation 512 may be followed by operation 514. Operation 512 may involve prompting the user to enable or disable temporary increased durability mode. As aforementioned, the extreme sport mode may also present to the user the option to occasionally reduce the performance of the vehicle in order to use the increased performance of the extreme sport mode, while also minimizing the impact of the mode on the durability of the parts of the vehicle. Thus, the user may be prompted as to whether they wish to allow the vehicle to periodically enable the increased durability mode to ensure that vehicle components are not constantly subjected to performance driving. However, the user may have the option to disable these periodic durability modes. Given this, operation 516 may involve determining that the user declines the temporary durability mode. In such cases, operation 516 may be followed by operation 518, which may involve maintaining the increased performance mode. operation 520 may involve determining that the user accepts the temporary durability mode. In such cases, operation 522 may involve periodically enabling the increased durability mode to maximize the lifetime of the vehicle components.

Figure 6:
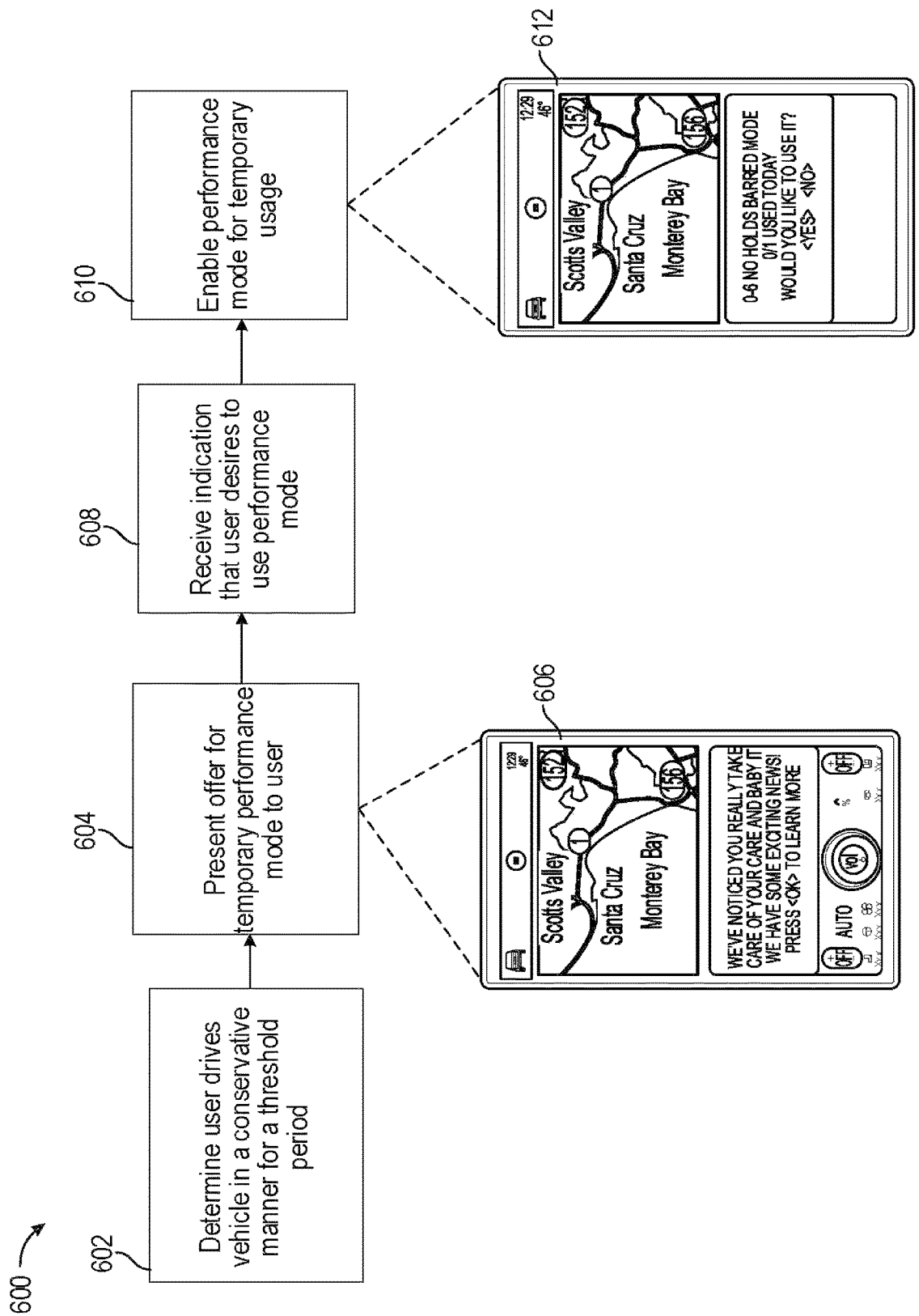
FIG. 6 illustrates another example use case, in accordance with one or more embodiments of the disclosure.

FIG. 6 illustrates an example use case 600, in accordance with one or more embodiments of the disclosure. Particularly, the use case 600 may involve a temporary increased performance mode that the user may be allowed to use on a limited basis. For example, the temporary increased performance mode may allow the user to access increased performance of the vehicle as an incentive for maintaining conservative driving behavior that will likely result in increased lifetime of the vehicle parts. For example, if it is determined that the user drivers the vehicle in a conservative manner for a threshold amount of time (or a threshold percentage of time), then the mode may be offered to the user on a periodic basis, and the user may be allowed to enable the mode for a single-time use, or for a limited period of time.

In some embodiments, the use case 600 may begin with operation 602, which may involve determining that a condition is met indicating that a temporary increased performance mode should be offered to the user. The condition may involve determining that the user has driven the vehicle in a conservative manner for a threshold period of time and/or a threshold percentage of the time the vehicle is driven. Conservative driving may be determined based on data such as acceleration data, braking data, lateral g-force data, etc. It should be noted that these types of data and the condition are merely intended to be exemplary, and any other types of data and/or conditions may also be applicable in this use case 600.

Operation 602 may be followed by operation 604, which may involve presenting an offer 606 to the user to install the temporary increased performance mode in the vehicle. The offer 606 may be presented to the user in any number of different manners. For example, the offer 606 may be presented on a mobile device of the user, on an HMI of the vehicle, and/or in any other form. The offer 606 may also be associated with a description providing an explanation to the user of the features that accompany the particular software package being presented to the user. Given that the temporary increased performance mode may be a single use mode (or a mode that only be used for a limited period of time), in some cases, the mode may not be presented as a trial, but the user may simply agree to download the mode to the vehicle and use the mode for the single use or the limited period of time.

Operation 604 may be followed by operation 608. Operation 608 may involve the user agreeing to download the trial software package for the temporary increased performance mode. For example, the user may select a button on a user interface of their mobile device and/or the HMI of the vehicle. The user may also indicate acceptance in any other manner, such as an auditory acceptance. Once the acceptance is received, the temporary increased performance mode may be installed on the vehicle.

Operation 608 may be followed by operation 610. Operation 610 may involve enabling the performance mode for temporary usage. The system may also present an option 612 for the user to use the mode. Once the temporary increased performance mode has been used, the mode may be disabled, and the vehicle may revert to a software revision associated with prior vehicle performance.

Figure 7:
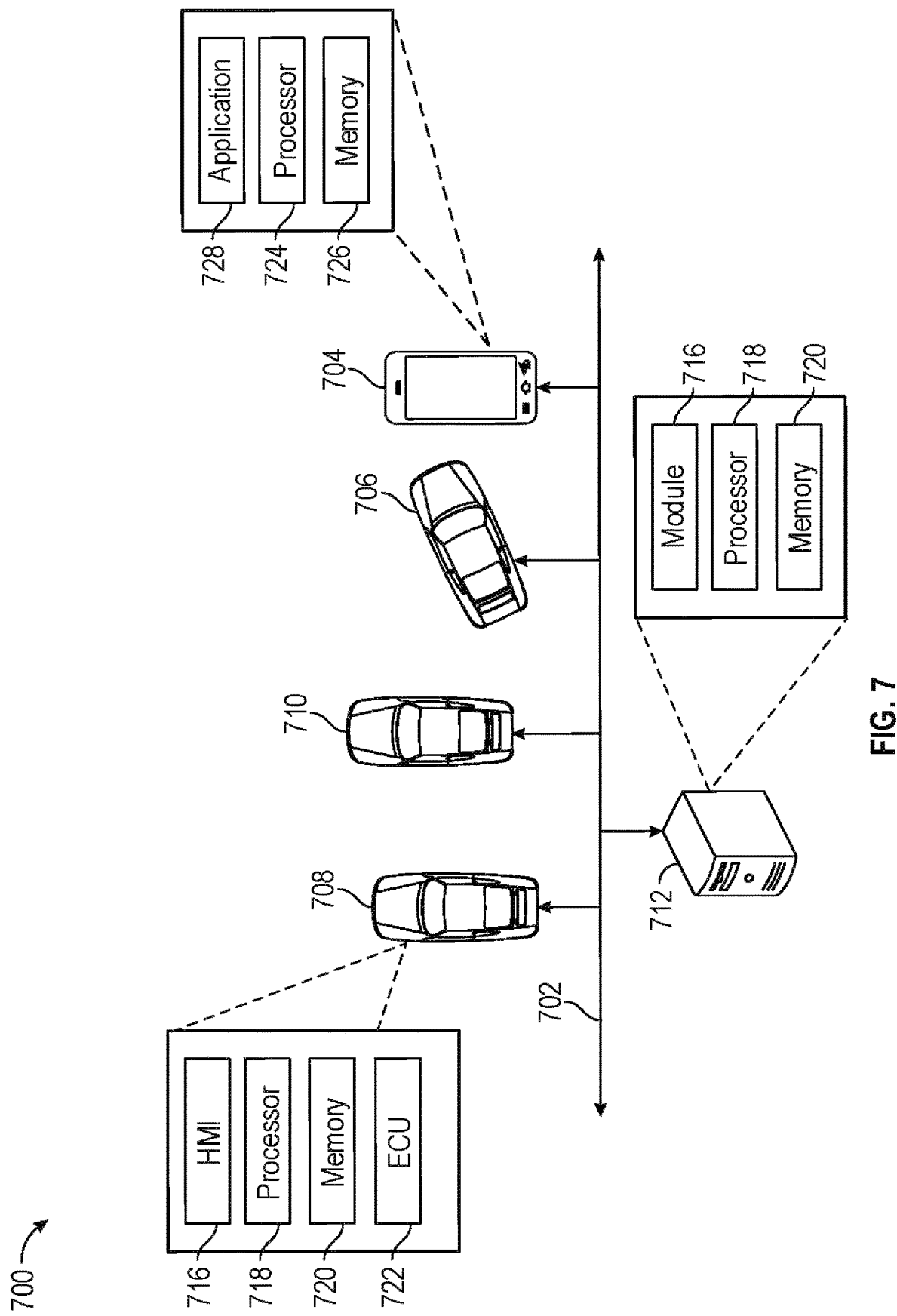
FIG. 7 illustrates an example system, in accordance with one or more embodiments of the disclosure.

FIG. 7 illustrates an example system 700, in accordance with one or more embodiments of the disclosure. In some embodiments, an example system 700 may include one or more vehicles (for example, vehicle 706, vehicle 708, and/or vehicle 710, as well as any other number of vehicles), one or more remote servers 712, and/or one or more mobile devices 704, which may be associated with one or more users (not depicted in the figure). The system 700 is merely exemplary, and a system as described herein may also include any other elements as well.

In some embodiments, the one or more vehicles may be example vehicles that may be presented with offers for different types of modes that may optionally be installed to the vehicle through one or more software updates. For example, the first vehicle 706 may be presented with an offer to install an increased performance mode, the second vehicle 708 may be presented with an offer to install an increased comfort mode, and the third vehicle 710 may be presented with an offer to install a customized ACC mode. These are merely examples, and any of the vehicles may be presented with offers to install any of the modes and/or any combination of multiples modes as described herein. A vehicle may include one or more processors 718 and/or memory 720. A vehicle may also include an HMI 716 and/or one or more electronic control units (ECUs) 722. An HMI 716 may be a user interface of the vehicle through which a user of the vehicle may be able to view and/or interact with offers presented for different software updates. Once accepted by the user, a software update may be installed on an ECU 722 of the vehicle. For example, if an increased performance mode is accepted by a user, a software update in the form of a tune may be installed on an ECU 722 of the vehicle to provide additional performance. A vehicle may also include any other elements described with respect to the machine 900 of FIG. 9 as well.

In some embodiments, a mobile device 704 may be a device (such as a smartphone, laptop computer, desktop computer, etc.) associated with a user that may also be used to present offers to users and allow the user to interact with the offer. For example, as an alternative, or in addition to, presenting the offer to the user through the HMI 716 of the vehicle, the offers may be presented through an application 728 included on the mobile device 704. A mobile device 704 may include one or more processors 724 and/or memory 726. A mobile device 704 may also include any other elements described with respect to the machine 900 of FIG. 9 as well.

A remote server 712 may be a system on which any of the analysis associated with presenting and managing offers to the one or more vehicles may be performed. In some cases, however, the processing may be performed locally at the one or more vehicles and/or the mobile device 704, or the processing may be split between the remote server 712 and the one or more vehicles and/or mobile device 704.

Figure 8:
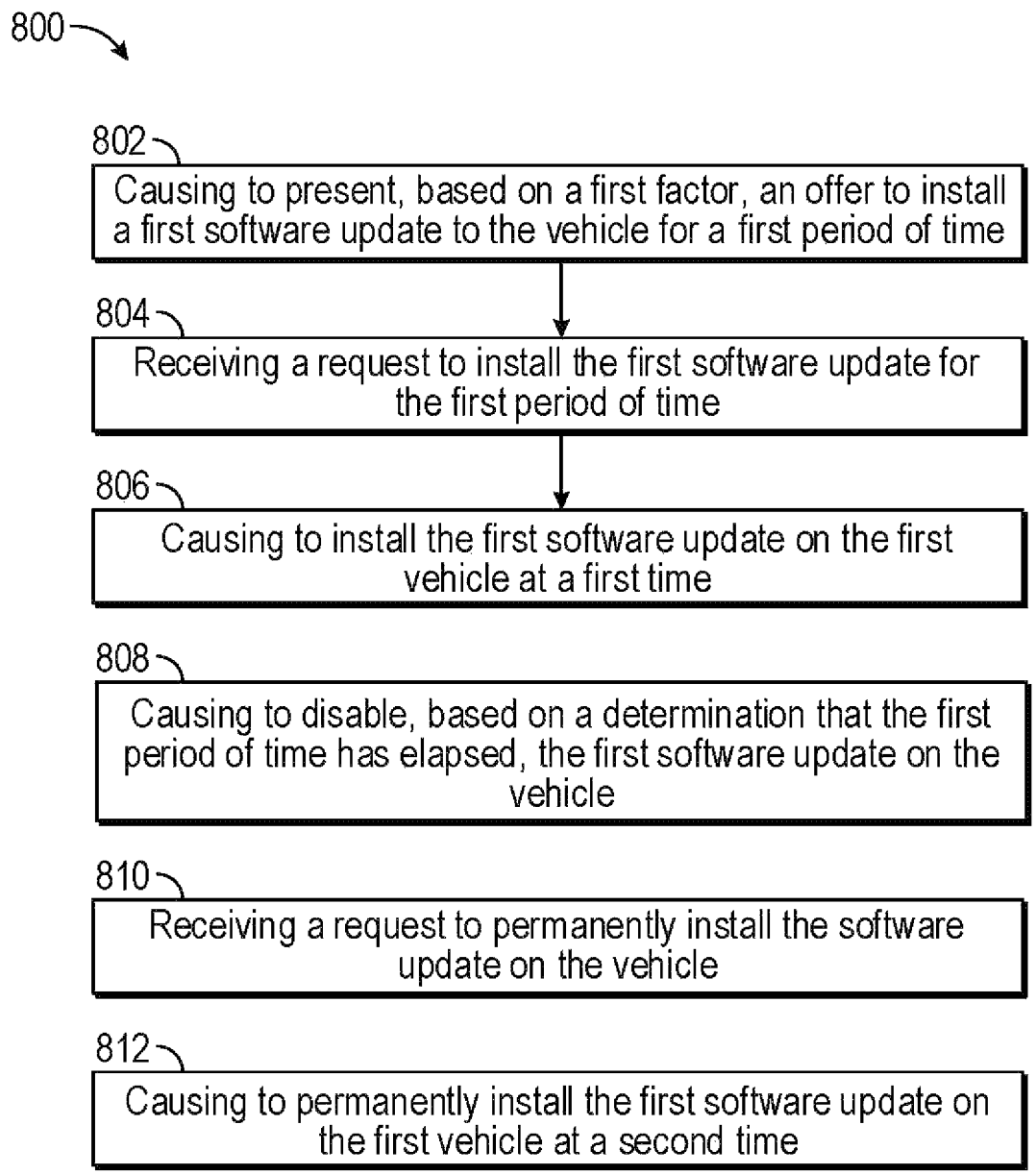
FIG. 8 illustrates an example method, in accordance with one or more embodiments of this disclosure.

FIG. 8 illustrates an example method 800, in accordance with one or more embodiments of this disclosure. At block 802, the method 800 may include causing to present, based on a first factor, an offer to install a first software update to the vehicle for a first period of time. The method 800 may also include receiving a request to install the first software update for the first period of time. The method 800 may also include causing to install the first software update on the first vehicle at a first time. The method 800 may also include causing to disable, based on a determination that the first period of time has elapsed, the first software update on the vehicle. The method 800 may also include receiving a request to permanently install the software update on the vehicle. The method 800 may also include causing to permanently install the first software update on the first vehicle at a second time.

Figure 9:
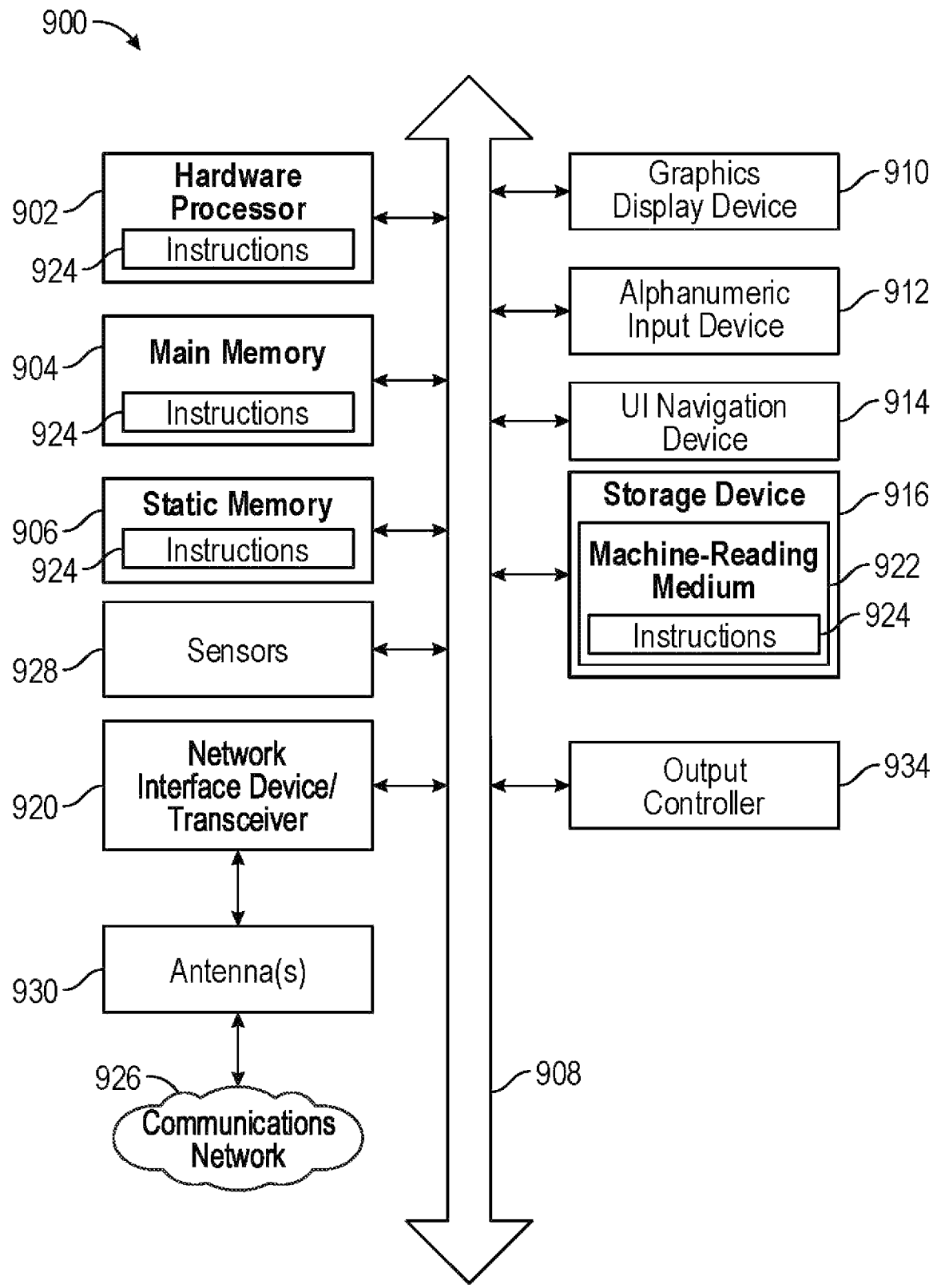
FIG. 9 illustrates an example of a computing system, in accordance with one or more embodiments of this disclosure.

FIG. 9 depicts a block diagram of an example machine 900 upon which any of one or more techniques (e.g., methods) may be performed, in accordance with one or more example embodiments of the present disclosure. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
a processor; and
a memory storing computer-executable instructions, that when executed by the processor, cause the processor to:
cause to present, based on a first factor, an offer to install a first software update to a vehicle for a first period of time;
receive a request to install the first software update for the first period of time;
cause to install the first software update on the vehicle at a first time;
cause to disable, based on a determination that the first period of time has elapsed, the first software update on the vehicle;
receive a request to permanently install the first software update on the vehicle;
cause to permanently install the first software update on the vehicle at a second time;
cause to disable, subsequent to the second time, the first software update;
cause to enable, at a third time and based on a first condition being satisfied, the first software update; and
cause to disable, at a fourth time, the first software update.

2. The system of claim 1, wherein the first factor includes at least one of: the vehicle being in a first location, a weather condition being present, a road condition being present, historical driving patterns associated with a user, or a maintenance condition associated with the vehicle.

3. The system of claim 1, wherein the first factor includes the vehicle being in a first location, and wherein the first condition includes the vehicle being present in the first location.

4. The system of claim 1, wherein the first factor includes a weather condition or a road condition being present, and wherein the first condition includes the weather condition or the road condition being present.

5. The system of claim 1, wherein the first factor is a maintenance condition associated with the vehicle, and wherein the first condition includes a vehicle component being associated with a threshold amount of mileage.

6. The system of claim 1, wherein the first software update is enabled at all times subsequent to the second time.

7. The system of claim 1, wherein the computer-executable instructions further cause the processor to:
cause to permanently install a second software update on the vehicle, wherein the first software update and second software update are different types of software updates;
cause to disable, subsequent to the second time, the first software update;
cause to enable, at a third time and based on a first condition being satisfied, the first software update; and
cause to disable, at a fourth time, the first software update, wherein the second software update is enabled at all times subsequent to the second time.

8. The system of claim 1, wherein the offer is presented on at least one of: a mobile device associated with a user or a human machine interface (HMI) of the vehicle.

9. A method comprising:
causing to present, based on a first factor, an offer to install a first software update to a vehicle for a first period of time;
receiving a request to install the first software update for the first period of time;
causing to install the first software update on the vehicle at a first time;
causing to disable, based on a determination that the first period of time has elapsed, the first software update on the vehicle;
receiving a request to permanently install the first software update on the vehicle; and
causing to permanently install the first software update on the vehicle at a second time causing to disable, subsequent to the second time, the first software update;
causing to enable, at a third time and based on a first condition being satisfied, the first software update; and
causing to disable, at a fourth time, the first software update.

10. The method of claim 9, wherein the first factor includes at least one of: the vehicle being in a first location, a weather condition being present, a road condition being present, historical driving patterns associated with a user, or a maintenance condition associated with the vehicle.

11. The method of claim 9, wherein the first factor includes the vehicle being in a first location, and wherein the first condition includes the vehicle being present in the first location.

12. The method of claim 9, wherein the first factor includes a weather condition or a road condition being present, and wherein the first condition includes the weather condition or the road condition being present.

13. The method of claim 9, wherein the first factor is a maintenance condition associated with the vehicle, and wherein the first condition includes a vehicle component being associated with a threshold amount of mileage.

14. The method of claim 9, wherein the first software update is enabled at all times subsequent to the second time.

15. The method of claim 9, further comprising:
causing to permanently install a second software update on the vehicle, wherein the first software update and second software update are different types of software updates;
causing to disable, subsequent to the second time, the first software update;
causing to enable, at a third time and based on a first condition being satisfied, the first software update; and
causing to disable, at a fourth time, the first software update, wherein the second software update is enabled at all times subsequent to the second time.

16. The method of claim 9, wherein the offer is presented on at least one of: a mobile device associated with a user or a human machine interface (HMI) of the vehicle.

17. A non-transitory computer-readable medium storing computer-executable instructions, that when executed by a processor, cause the processor to perform operations of:
causing to present, based on a first factor, an offer to install a first software update to a vehicle for a first period of time;
receiving a request to install the first software update for the first period of time;
causing to install the first software update on the vehicle at a first time;
causing to disable, based on a determination that the first period of time has elapsed, the first software update on the vehicle;
receiving a request to permanently install the first software update on the vehicle; and
causing to permanently install the first software update on the vehicle at a second time causing to permanently install a second software update on the vehicle, wherein the first software update and second software update are different types of software updates;

causing to disable, subsequent to the second time, the first software update;
causing to enable, at a third time and based on a first condition being satisfied, the first software update; and
causing to disable, at a fourth time, the first software update, wherein the second software update is enabled at all times subsequent to the second time.

18. The non-transitory computer-readable medium of claim 17, wherein the first factor includes at least one of: the vehicle being in a first location, a weather condition being present, a road condition being present, historical driving patterns associated with a user, or a maintenance condition associated with the vehicle.

\* \* \* \* \*